United States Patent [19]

Brass et al.

[11] 4,432,413

[45] Feb. 21, 1984

[54] HEAT ABSORBER

[75] Inventors: Holger Brass, Waldbrunn; Herbert Braunisch, Hofheim am Taunis; Dieter Disselbeck, Bad Soden am Taunus; Helmut Golly, Kelkheim, all of Fed. Rep. of Germany

[73] Assignee: Hoechst AG., Frankfurt am Main, Fed. Rep. of Germany

[21] Appl. No.: 315,070

[22] Filed: Oct. 26, 1981

[30] Foreign Application Priority Data

Oct. 28, 1980 [DE] Fed. Rep. of Germany ....... 3040510

[51] Int. Cl.³ .......................... F28F 13/18; F24J 3/02
[52] U.S. Cl. .............................. 165/133; 165/DIG. 1; 126/449
[58] Field of Search ............... 126/442, 444, 448, 449; 165/133, 181, 170, DIG. 1

[56] References Cited

U.S. PATENT DOCUMENTS

| 3,893,507 | 7/1975 | MacCracken | 126/448 |
| 4,062,348 | 12/1977 | Morrison | 126/448 |
| 4,210,129 | 7/1980 | O'Hanlon | 126/447 |
| 4,230,175 | 10/1980 | Disselbeck et al. | 165/46 |
| 4,231,423 | 11/1980 | Haslett | 165/133 |

FOREIGN PATENT DOCUMENTS

| 3004398 | 8/1981 | Fed. Rep. of Germany ... 165/DIG.1 |
| 930991 | 7/1963 | United Kingdom . |
| 2062838 | 5/1981 | United Kingdom . |

*Primary Examiner*—Samuel Scott
*Assistant Examiner*—G. Anderson
*Attorney, Agent, or Firm*—Curtis, Morris & Safford

[57] ABSTRACT

In ambient-air heat absorbers composed of many heat exchanger elements arranged one above another, the flowing air often flows too smoothly through the intermediate spaces, so that the heat exchange takes place only incompletely. As a result of the insertion of lattice grids onto the (smooth) surface of the heat exchanger elements, this uniform flow is varied. The result of this is a greater absorption of heat by the absorber.

11 Claims, 1 Drawing Figure

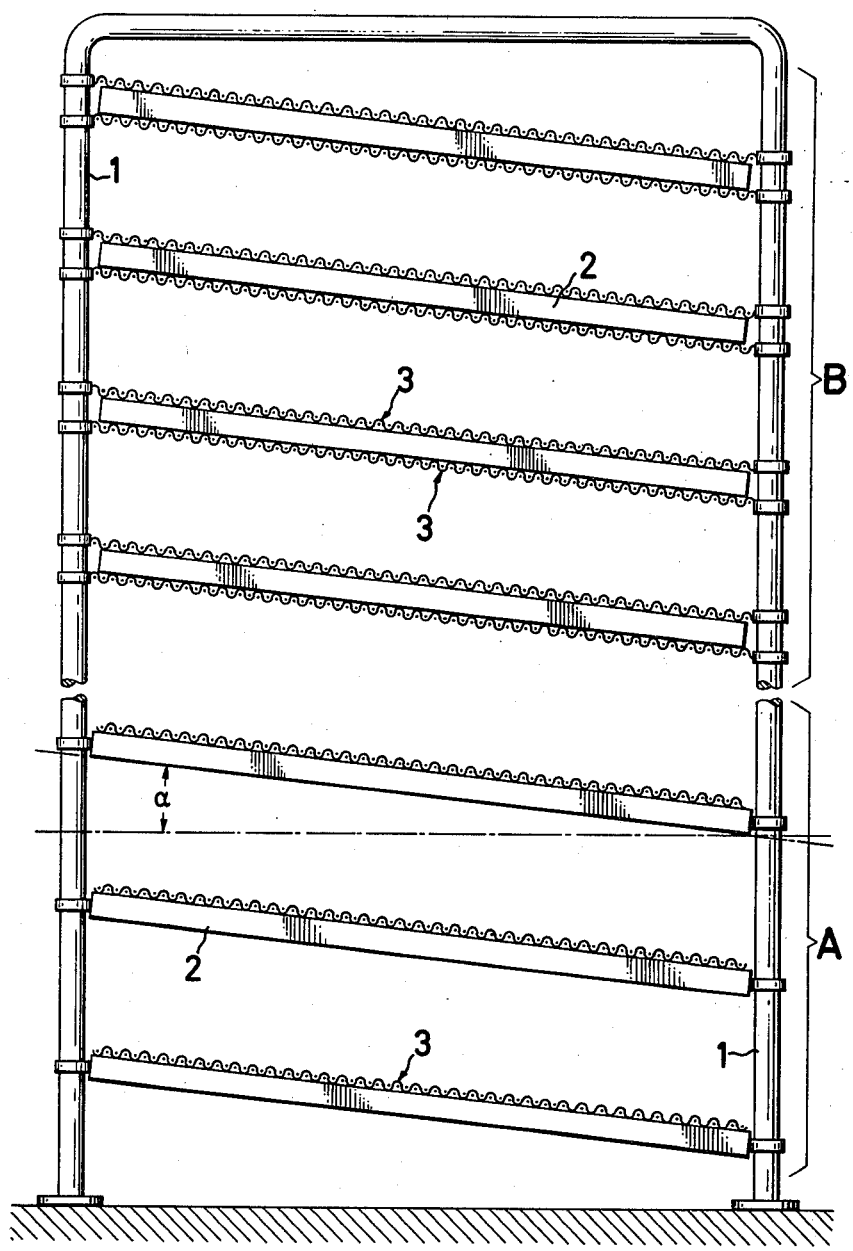

HEAT ABSORBER

The invention relates to an ambient-air heat absorber composed of several heat exchanger elements which, arranged one above another, form an intermediate space in each case, and of a frame holding the heat exchanger elements.

Heat-pump heating systems utilizing, among other things, the ambient air as a heat source are assuming increasing importance for the heating of buildings. In this process, heat is extracted from the wind-moved air via an ambient-air heat absorber, through which flows a heat transfer medium colder than the outside-air temperature. This heat at ambient temperature is utilized by means of the heat pump, mostly using electrical energy, in order to make heat for heating available at the desired temperature level.

Ambient-air heat absorbers having several plate-shaped heat exchanger elements are known, the latter being arranged at a distance one above another in a frame or being suspended parallel to one another in the frame. They are also described as an energy stack, energy shelves or an energy box.

In all these designs, the heat gain depends essentially on the wind velocity. It has been shown that, in the case of heat exchanger surfaces arranged in parallel at a certain distance from one another, there arises on their surface a laminar flow which is disadvantageous for optimum heat transfer.

Furthermore, heat exchanger surfaces arranged substantially horizontally have the disadvantage that the condensate from the atmospheric moisture, which condensate arises during the extraction of heat, is not eliminated immediately and, consequently, extracts heat from the system again during evaporation.

The object is to do away with these defects by constructional measures.

The object is achieved, according to the invention, due to the fact that a lattice grid is arranged at least on one surface of the heat exchanger elements. These lattice grids can consist either of metallic materials or of plastics. The result, surprisingly, is that the heat gain increases markedly, this being attributable, among other things, to the fact that a turbulence having an advantageous effect on the heat transfer develops at the surface of the heat exchanger elements. Lattice grids are preferably woven, as open fabrics or nets, but also can be other structured perforated sheet-like structures.

It was found that, at a wind velocity of 1 m/s, an air temperature of $+4°$ C., a mean temperature of the heat transfer medium of $-1°$ C. and a relative atmospheric humidity of 50%, the heat gain could be increased by approximately 60%, if, according to the invention, each heat exchanger element was covered with a lattice grid on both sides.

It has also been shown that the elimination of the condensate is ensured, if the heat exchanger element, together with a lattice grid located on its surface, is arranged in the frame with an inclination of 5° to 7° to the horizontal.

An advantageous embodiment of the invention is obtained if the heat exchanger elements are inserted loosely between two lattice grids and if the lattice grids are fastened to the frame.

In this way, the heat exchanger elements are subject to no alternating stresses caused by tensile forces arising as a result of changes in length induced by temperature.

It has also been shown that the distance between the heat exchanger elements arranged parallel to one another is important in terms of the energy efficiency. In the case of natural wind movement, a distance between the heat exchanger elements of 10 to 30 cm is the optimum.

The heat exchanger elements used are, for example, of the type shown in U.S. Pat. No. 4,230,175. In such heat exchanger elements, a heat transfer medium, such as water, flows between upper and lower surfaces thereof across which heat is exchanged with a second medium, namely the ambient air.

The sole drawing FIGURE illustrates the design of the ambient-air heat absorber according to the invention. In this, (1) designates the frame construction, (2) the heat exchanger elements and (3) the lattice grid.

The FIGURE shows the heat absorber according to the invention in a side elevation. The heat exchanger elements (2) are disposed at a slight angle $\alpha$ to the horizontal. Part A represents the embodiment with a clamped heat exchanger element (2) and a lattice grid (3) placed thereon; in part B, the lattice grids are clamped in the frame (1) and each heat exchanger element (2) is inserted between a respective pair of grids (3).

We claim:

1. An ambient-air heat absorber comprising a plurality of flat plate-type heat exchanger elements each having an upper surface and a lower surface, between which upper and lower surfaces flows a heat transfer medium; a frame supporting said heat exchanger elements generally horizontally and one above the other with a predetermined spacing therebetween, while permitting natural flow of ambient air across said heat exchanger elements; and a plurality of lattice grids each formed of plastics and arranged on at least one of the upper and lower surfaces of a respective one of said heat exchanger elements to disrupt laminar flow of said ambient air across the respective surface of the associated heat exchanger element.

2. An ambient-air heat absorber as claimed in claim 1, wherein the individual heat exchanger elements are arranged parallel to one another at an angle of 5° to 7° to the horizontal.

3. An ambient-air heat absorber as claimed in claim 1, wherein the heat exchanger elements are inserted between lattice grids and the lattice grids are fastened to the frame.

4. An ambient-air heat absorber as claimed in any of claims 1, 2, or 3 wherein the distance between the heat exchanger elements is at least 10 and at most 30 cm.

5. An ambient-air heat absorber as claimed in claim 1, wherein said lattice grids are formed of open woven fabric.

6. An ambient-air heat absorber comprising a plurality of flat plate-type heat exchanger elements, each having an upper surface and a lower surface, between which upper and lower surfaces flows a heat transfer medium; a frame supporting said heat exchanger elements generally horizontally and one above the other with a predetermined spacing therebetween; and a plurality of lattice grids fastened to the frame and each arranged on at least one of the upper and lower surfaces of a respective one of said heat exchanger elements, with the heat exchanger elements being inserted between the lattice grids; wherein said heat exchanger elements are loosely supported only by said lattice grids, so that the elements are not subjected to tensile forces arising from temperature-induced changes in length thereof.

7. An ambient-air heat absorber as claimed in claim 6, wherein the individual heat exchanger elements are arranged in parallel to one another at an angle of 5° to 7° to the horizontal.

8. An ambient-air heat absorber as claimed in claim 6, wherein the distance between successive heat exchanger elements is at least 10 cm and at most 30 cm.

9. An ambient-air heat absorber as claimed in claim 6, wherein said lattice grids are formed of open woven fabric.

10. An ambient-air heat absorber as claimed in claim 6, wherein said lattice grids are formed of metallic material.

11. An ambient-air heat absorber as claimed in claim 6, wherein said lattice grids are formed of plastics.

* * * * *